United States Patent [19]

Anderson et al.

[11] 4,417,648
[45] Nov. 29, 1983

[54] BRAKING ARRANGEMENT FOR VEHICLES

[75] Inventors: Brenda L. Anderson, Sutter Creek; Ronald J. Boyd, Sacramento, both of Calif.

[73] Assignee: General Electric Company, Milwaukee, Wis.

[21] Appl. No.: 283,170

[22] Filed: Jul. 14, 1981

[51] Int. Cl.³ .............................................. B60T 7/10
[52] U.S. Cl. ...................................... 188/119; 188/17
[58] Field of Search .................... 188/5, 6, 17, 19, 20, 188/21, 29, 74, 119, 204 R

[56] References Cited

U.S. PATENT DOCUMENTS

| 2,169,781 | 8/1939 | Abresch | 188/119 |
| 3,134,461 | 5/1964 | Klemm et al. | 188/119 |
| 3,154,316 | 10/1964 | Gohmann | 188/119 X |
| 3,516,521 | 6/1970 | Wolf | 188/119 |

Primary Examiner—Duane A. Reger
Attorney, Agent, or Firm—Robert C. Sullivan; Dana F. Bigelow; Douglas E. Stoner

[57] ABSTRACT

A braking arrangement for vehicles having a "dead man" brake, and which includes means for rendering the dead man brake ineffective during a particular mode of operation. A three-position brake control handle is pivotally mounted on the stationary structure of the vehicle, and includes cam means in camming relation to cam follower means carried by an actuator rod. In the "transport" position of the control handle manual pressure is continuously applied to the handle, the camming engagement of the handle with the cam follower means moving the actuator rod to a position in which the brake shoe is moved against a spring out of engagement with the brake drum. If manual pressure is released from the brake control handle when in "transport" position, the handle is automatically moved by the spring to the "dead man" position in which the spring causes the brake shoe to be moved into braking engagement with the brake drum. In a third or procedural/storage position of the brake control handle, the camming relation between the handle and the cam follower causes the actuator rod to be moved to a position in which the brake shoe is out of engagement with the brake drum of the wheel without continuous force on the control handle.

A separate pivotally movable support means is provided for each brake shoe for distributing the braking force equally between the two wheels which are being braked despite any inequalities between the braking surfaces of the two wheels.

19 Claims, 8 Drawing Figures

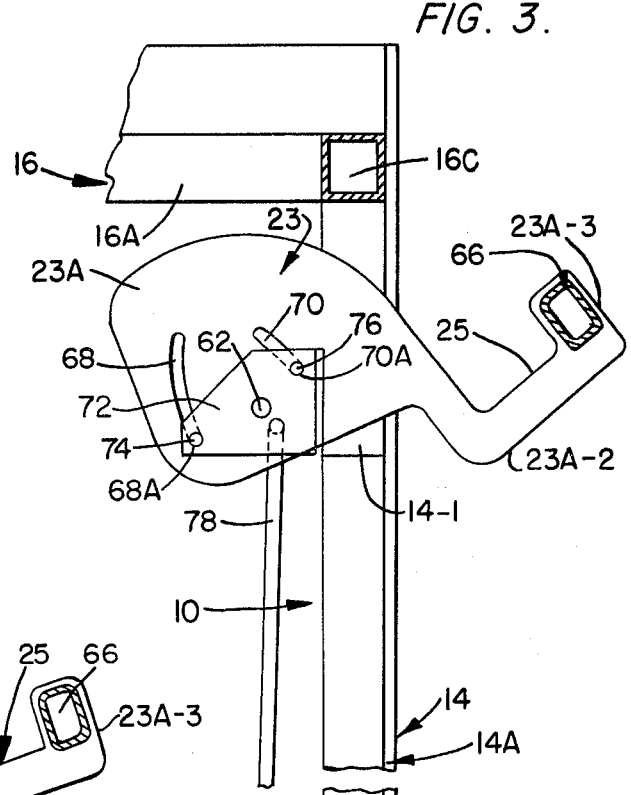
FIG. 3.
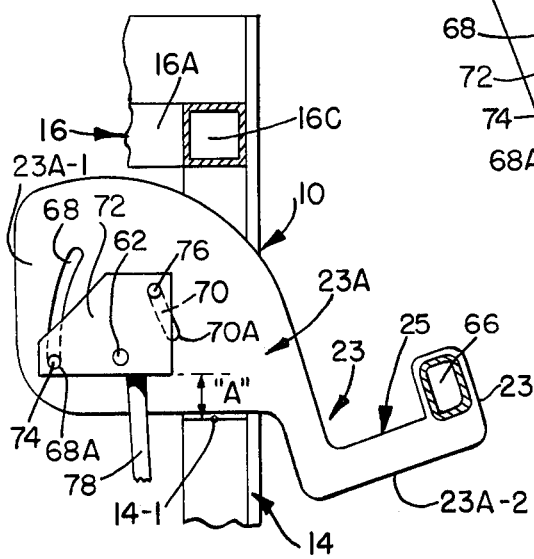
FIG. 4.
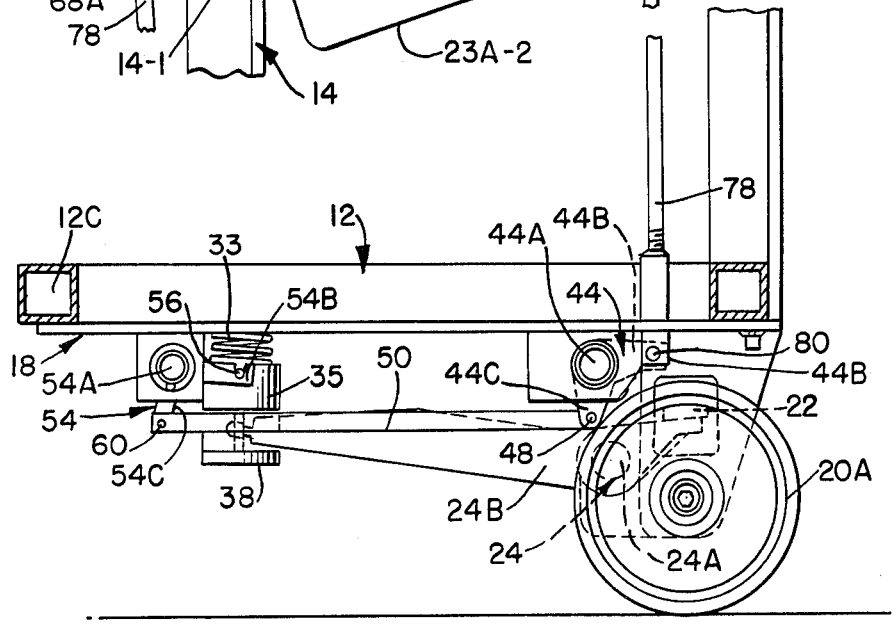

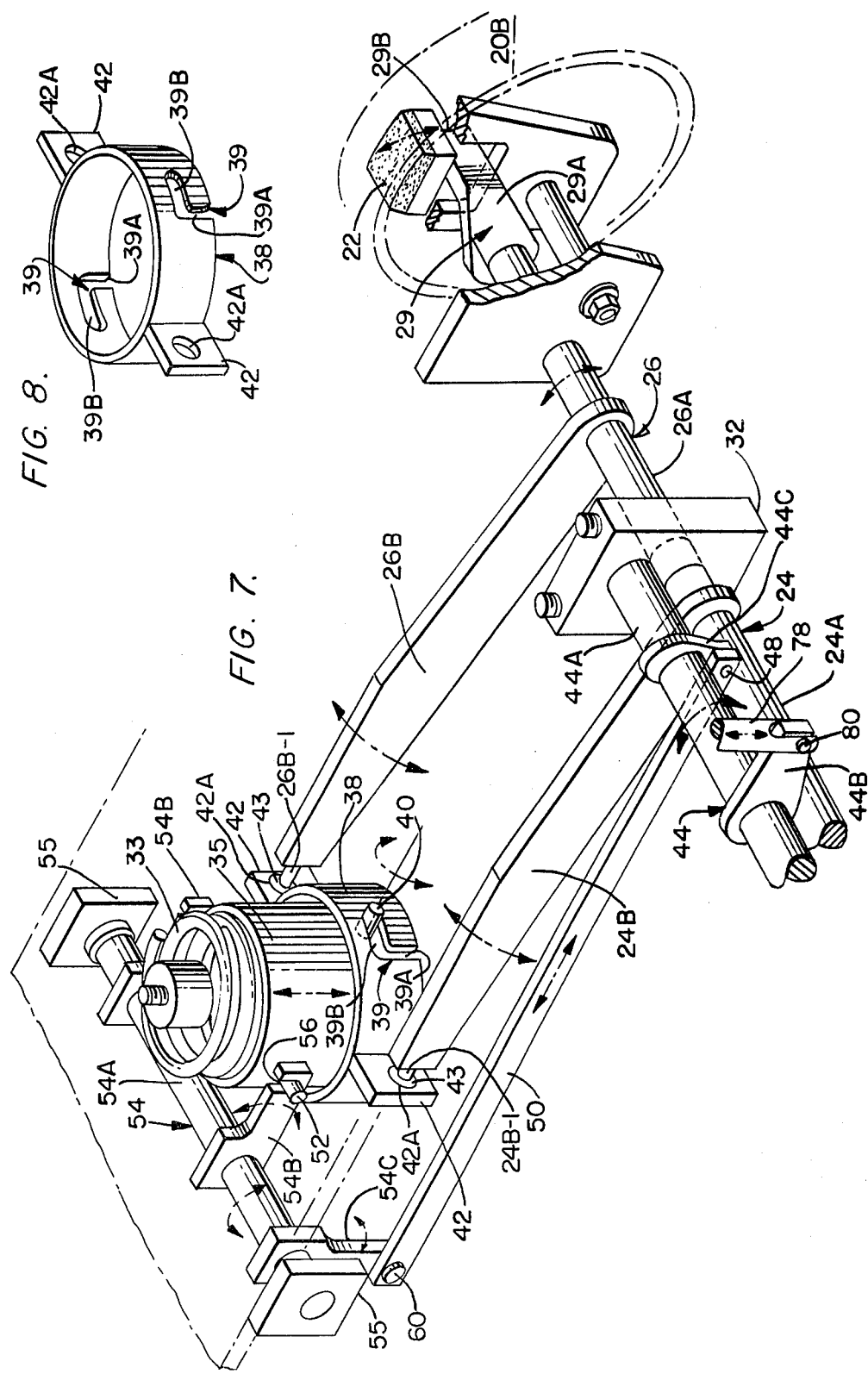

BRAKING ARRANGEMENT FOR VEHICLES

FIELD OF THE INVENTION

This invention relates to brakes for vehicles, and more particularly, to a "dead man" brake and to means for disabling or overriding a dead man brake during a predetermined mode of operation of the vehicle on which the brake is mounted, and without the necessity of continual manual pressure being exerted by an operator. While not restricted thereto, the braking arrangement and dead man brake of the invention have particular utility in connection with and will be described in connection with a mobile vehicle or "dolly" used for supporting and transporting a medical diagnostic apparatus or console, such as an ultrasound (high frequency sound) medical diagnostic apparatus, in which it is desirable that the dead man brake be rendered ineffective during the medical diagnostic procedure without the necessity of continuous manual pressure being exerted by the operator, to thereby free the operator's hands and otherwise provide mobility for the operator during the medical diagnostic procedure.

BACKGROUND OF THE PRIOR ART

It has been known in the prior art to mount medical diagnostic equipment such as ultrasound or high frequency sound medical diagnostic apparatus on a mobile wheeled unit or vehicle whereby to make the medical diagnostic equipment mobile for movement throughout a medical facility or hospital.

From a safety standpoint, it is desirable that the mobile unit on which the diagnostic equipment is mounted be provided with a "dead man" brake to prevent unintended movement of the mobile unit. As is well known, the normal mode of operation of a normal dead man brake mechanism is for the brake to be engaged, with release of the brake occurring only when force is exerted by the operator on the brake operating handle. Thus, when the mobile unit is in the transport mode of operation (i.e., with the vehicle in motion), with a normal dead man brake mechanism, it is necessary for the operator to continuously exert manual force on the brake control handle to insure that the brake is disengaged during the transport mode.

However, the requirement inherent in the normal dead man brake mechanism that the operator constantly maintain pressure on the brake control handle to disengage the dead man brake restricts the operator's ability to maneuver the wheeled console during the medical diagnostic procedure, and prevents the operator from having free use of both hands during the medical diagnostic procedure.

STATEMENT OF THE INVENTION

Accordingly, it is an object of the present invention to provide a dead man brake arrangement for a mobile vehicle in which the brake arrangement includes a mode of operation in which the dead man brake may be disabled or rendered ineffective without manual force being continuously exerted by the operator.

It is a further object of the invention to provide a braking arrangement which is particularly suitable for use with a mobile unit which supports medical diagnostic equipment, including a dead man brake arrangement which is adapted to be disabled during the medical diagnostic procedure, whereby to permit the operator to maneuver the mobile diagnostic console without being forced to continuously apply pressure to the brake control handle, and to free the hands of the operator during the medical diagnostic procedure.

It is still a further object of the invention to provide a dead man brake arrangement for a mobile vehicle in which the brake arrangement includes a brake control handle which may be moved to a "parked" out-of-the-way position to reduce the dimension of the vehicle and thereby make the vehicle more compact for storage.

It is a further object of the invention to provide a braking arrangement for the wheels of a dolly-like vehicle in which braking force is applied equally to each of a pair of laterally spaced wheels despite any disparities between the braking surfaces of the two laterally spaced wheels.

BRIEF SUMMARY OF THE INVENTION

In achievement of these objectives, there is provided in accordance with the invention a vehicle comprising a framework and at least one wheel supported for rotation by said framework, a brake drum carried by said at least one wheel, a brake shoe mounted for movement into or out of braking engagement with said brake drum, a support means mounted on said framework for angular pivotal movement about a substantially horizontal axis which lies substantially transverse of the longitudinal axis of said vehicle, said brake shoe being mounted on said support means for pivotal movement with said support means, a spring means mounted to normally exert force against said support means to cause said support means to normally pivotally move in a direction which moves said brake shoe into engagement with said brake drum, an actuator member for effecting movement of said brake shoe out of engagement with said brake drum, means connecting said actuator member to said support means whereby a predetermined movement of said actuator member moves said support means against the force of said spring means to move said brake shoe out of engagement with said brake drum, a brake control handle mounted on said framework, a cam defining a first cam means and a cam follower engageable with said cam and defining a second cam means, one of said cam means being carried by said control handle, the other of said cam means being connected to said actuator member and engageable with said cam means carried by said handle, whereby movement of said control handle to a predetermined position is effective to cause said predetermined movement of said actuator member due to the cooperative interaction of said first and said second cam means with each other, whereby to move said brake shoe out of engagement with said brake drum.

In accordance with an important aspect of the invention, the control handle may be moved to a "parked" or procedural/storage position in which the brake shoe is maintained out of engagement with the brake drum, and without the necessity of continual pressure being exerted by the operator to maintain the control handle in the parked position.

A further feature of the invention is an arrangement in which a separate pivotally movable support means is provided for each brake shoe for distributing the braking force equally between the two wheels which are being braked (normally the rear wheels) despite any disparities between the braking surfaces of the two wheels being braked.

BRIEF DESCRIPTION OF THE DRAWINGS

Further objects and advantages of the invention will become apparent from the following description taken in conjunction with the accompanying drawings in which:

FIG. 3 is a view partially in side elevation and partially in section showing the brake control handle and brake mechanism in a position corresponding to the "dead man" or engaged position of the brake, with manual force being removed from the brake handle;

FIG. 4 is a fragmentary view partially in side elevation and partially in section showing the brake control handle in transport position in which manual force is exerted on the handle to cause the dead man brake of the mobile unit to be deactivated;

FIG. 7 is a perspective view of the brake control mechanism mounted on the brake base; and FIG. 8 is a perspective view of the "bridle" member which forms part of the brake control mechanism.

DESCRIPTION OF THE PREFERRED EMBODIMENT

Figure 1:
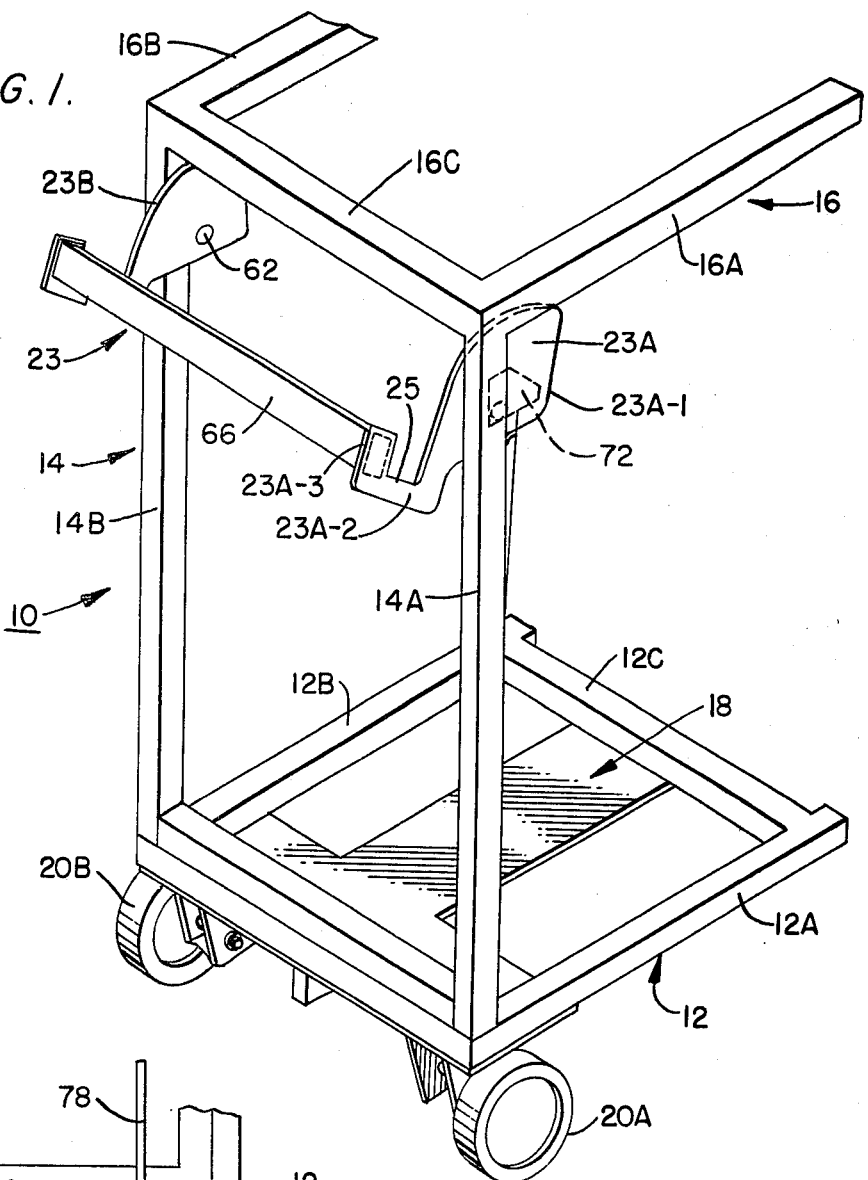
FIG. 1 is a view in perspective of the rear or back end of a mobile vehicular unit such as a mobile medical diagnostic console which incorporates the braking mechanism of the invention on the rear wheels of the vehicle.

Referring now to FIG. 1 there is shown a wheeled vehicle generally indicated at 10 which in the illustrated and described embodiment serves as a means of supporting and transporting a medical diagnostic apparatus or console such as an ultrasound system and apparatus used in hospitals or the like. The wheeled vehicle 10 includes a lower framework portion generally indicated at 12 including opposite side frame members 12A and 12B which extend lengthwise of vehicle 10 and which are connected by one or more cross frame members such as that indicated at 12C. At the back or rear end of vehicle 10, the framework also includes a vertical frame portion 14 comprising a pair of laterally spaced normally upright vertical frame members 14A and 14B attached at their upper ends to laterally spaced longitudinally extending top frame members 16A and 16B of an upper frame portion generally indicated at 16.

Two laterally spaced wheels 20A, 20B which define the rear wheels of vehicle 10 are supported for rotation by bearing brackets on a T-shaped brake base generally indicated at 18 which underlies and is suitably secured to the under surface of lower framework portion 12.

Figure 2:
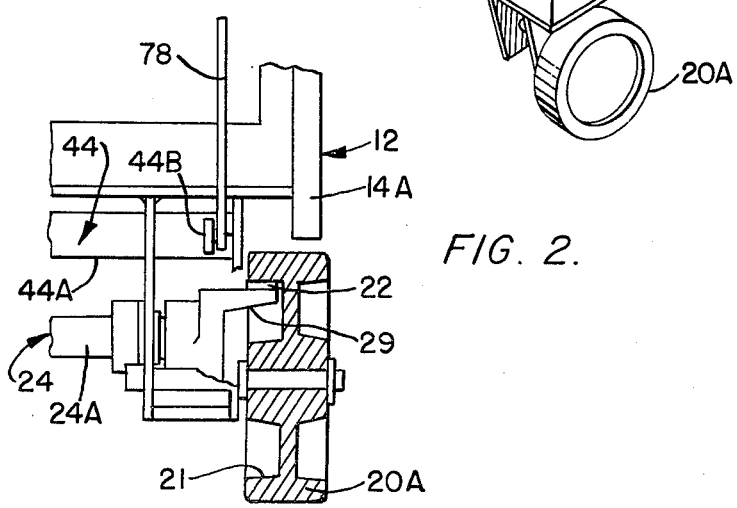
FIG. 2 is a fragmentary view, partially in elevation and partially in section, showing details of the brake mechanism for the vehicle of FIG. 1.

Each of the wheels 20A, 20B is provided with a brake drum 21 (FIGS. 2, 7) around the inner periphery of the respective wheel and a pair of laterally spaced brake shoes, each respectively indicated at 22, is adapted to brakingly engage a corresponding brake drum 21 to apply brake pressure to the corresponding wheel 20A, 20B.

The wheeled vehicular unit 10 is also provided with front wheels (not shown) which are suitably supported at the forward end of the framework. The front wheels of vehicular unit 10 are not normally provided with brakes.

Figure 6:
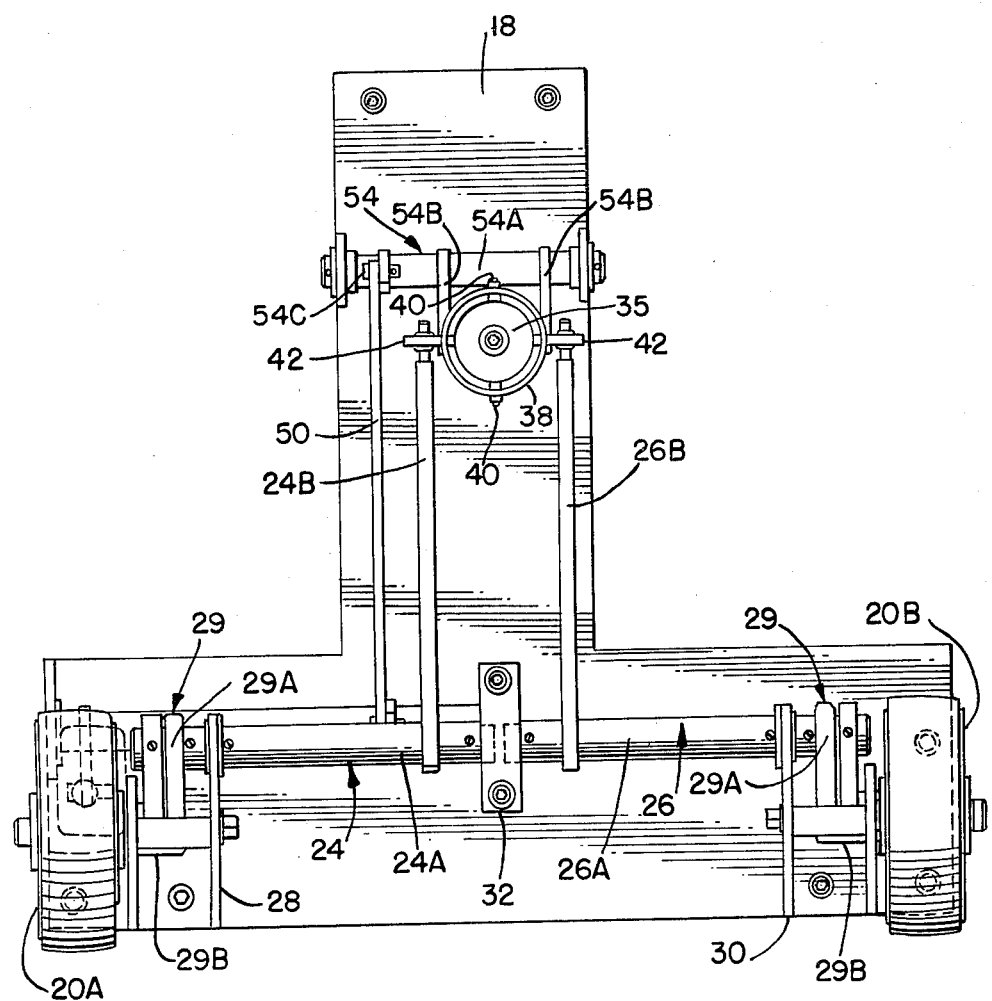
FIG. 6 is a view from underneath the mobile vehicular unit, showing the brake base, the rear wheels supported on the brake base, and the brake mechanism for the rear wheels mounted on the brake base.

The two laterally spaced brake shoes 22 which engage the respective brake drums 21 of the oppositely disposed wheels 20A, 20B are mounted on and move with two independently angularly rotatable brake arm subassemblies respectively generally indicated at 24 and 26 (FIG. 6). Brake arm subassembly 24 which is at the left as viewed in FIG. 6, comprises a horizontal shaft 24A which is supported for angular rotary movement contiguous its laterally outer portion by a bearing bracket 28 which is mounted on the left side of brake base 18 relative to the view shown in FIG. 6. Similarly, brake arm subassembly 26, which is at the right as viewed in FIG. 6, includes a horizontal shaft 26A which is supported contiguous the laterally outer portion thereof by a bearing bracket 30 mounted on brake base 18. A boss 32 which is mounted in a centrally located position relative to the transverse dimension of brake base 18 serves as a bearing for the laterally inner ends of horizontal shafts 24A, 26A of the respective brake arm subassemblies 24 and 26.

A separate brake shoe 22 corresponding to the brake drum 21 of each of the opposite wheels 20A, 20B is mounted on and is angularly rotatable with a corresponding one of the respective horizontal shafts 24A, 26A of brake arm subassemblies 24, 26. Each brake shoe 22 is supported on and carried by a corresponding brake shoe support arm generally indicated at 29 (FIGS. 6,7) which includes a portion 29A secured to and extending radially outwardly from a corresponding horizontal shaft 24A or 26A, and an upper or radially outer support arm portion 29B which extends for a short distance in a direction generally parallel to the axis of horizontal shafts 24A, 26A and on which the corresponding brake shoe 22 is mounted.

Each of the independently angularly rotatable brake arm subassemblies 24, 26 also includes and has movable therewith a corresponding brake lever arm 24B, 26B. Thus, brake arm subassembly 24 has secured thereto a brake lever arm 24B while brake arm subassembly 26 has a corresponding brake lever arm 26B secured thereto and movable therewith. The two brake arm subassemblies 24 and 26 are adapted to cooperate with a helical spring generally indicated at 33 which is seated in a cup-like spring retainer or holder 35. The normally upper end of spring 33 bears against the under surface of brake base 18 while the normally lower end of spring 33 bears against the bottom surface of spring cup 35. A centering boss 37 carried by the under surface of brake base 18 is received within the hollow interior of helical spring 33.

The laterally spaced brake lever arms 24B and 26B extend in parallel relation to each other lengthwise of brake base 18 and of vehicle 10, and the forward ends of the respective brake lever arms 24B, 26B with respect to the front-to-rear dimension of vehicle 10 are respectively secured to an annular bridle generally indicated at 38 which is concentric with the outer cylindrical surface of spring cup 35 but lies radially outwardly of the outer periphery of spring cup 35. Spring cup 35 is provided with two diametrically opposite lug members each indicated at 40, and bridle 38 is mounted on lug members 40, whereby any vertical movement of spring retainer cup 35 is imparted to bridle 38.

As best seen in the views of FIGS. 7 and 8, bridle 38 is provided with two diametrically opposed slots each indicated at 39. Each slot 39 includes a substantially vertical slot portion 39A which extends upwardly from the bottom edge of bridle 38, and a slot portion 39B which extends from the upper end of vertical slot portion 39A in a direction substantially circumferentially of bridle 38.

In assembling bridle 38 onto spring retainer cup 35, the bottom of vertical slot portion 39A of each of the diametrically opposed slots 39 is first engaged with a corresponding lug 40 on spring cup 35, lug 40 and slot 39 moving relative to each other along vertical slot portion 39A, lug 40 finally being received in the end of circumferential slot portion 39B, which is remote from vertical slot portion 39A, as best seen in the view of FIG. 7.

Lugs 40 on spring retainer cup 35 lie substantially along the central longitudinal axis of the brake assembly and of vehicle 10. The mounting of bridle 38 on lugs 40 carried by spring retainer cup 35 permits bridle 38 to rock or pivot about the axis of lugs 40 and thus about the central longitudinal axis of the brake assembly and of vehicle 10 to accomodate differences in the angular position of brake lever arms 24B, 26B caused by disparities between the braking surface or brake drums 21 of the two rear wheels 20A, 20B.

Bridle 38 has integral therewith or suitably secured thereto two diametrically opposite "ears" or lugs each indicated at 42 which lie on an axis transverse of or at right angles to the axis of lugs 40 carried by spring retainer cup 35 when bridle 38 is assembled onto spring retainer cup 35 as best seen in the views of FIGS. 6 and 7. Each of the laterally projecting lugs 42 carried by bridle 38 has an aperture 42A which receives a spherical bearing assembly each respectively indicated at 43.

Each spherical bearing assembly 43 comprises a housing element having a spherical surface, and which is mounted in aperture 42A of lug 42 in fixed or stationary relation thereto; and an inner bearing element received in the housing element and having a spherical surface which can move relative to the spherical surface of the housing element.

The forward end, relative to the front-to-rear dimension of vehicle 10, of each of the respective brake lever arms 24B, 26B is provided with a relatively short cylindrical end portion respectively indicated at 24B-1, 26B-1, which is received in a passage in the inner movable bearing element of a corresponding one of the spherical bearing assemblies 43 carried by the respective lugs 42 on bridle member 38. Each end portion 24B-1, 26B-1 is secured to and moves with a corresponding one of the spherical surface inner bearing elements.

Thus, when brake lever arms 24B, 26B, and hence the corresponding brake arm subassemblies 24, 26 are secured to bridle 38 as just described, any vertical movement imparted to spring retainer cup 35 through a control linkage actuated by brake control handle 23 of vehicle 10, as will be described hereinafter, imparts a movement to brake arm subassemblies 24, 26 due to the connection of brake lever arms 24B, 26B to bridle 38 and thus to spring retainer cup 35.

Also, the spherical bearing arrangement just described permits movement of the ends 24B-1, 26B-1 of brake lever arms 24B, 26B relative to bridle 38 during rocking movement of bridle 38 about the axis of pins 40 on spring retainer cup 35, which rocking movement may occur due to variations or discrepancies in the braking surfaces of wheels 20A, 20B.

Spring retainer cup 35 in which helical spring 33 is seated is provided with two diametrically opposite lugs or pins 52 projecting from the outer cylindrical surface thereof. Pins 52 are in addition to the lugs 40 carried by spring cup 35 and on which bridle 38 is mounted. Pins 52 are positioned on the cylindrical surface of spring retainer cup 35 at a higher vertical level than that on which lugs 40 lie. Also, pins 52 lie on an axis which is transverse to the longitudinal axis of vehicle 10, and thus also transverse to the axis on which lugs 40 lie.

Each of the pins 52 is adapted to be received in a notch 56 in a corresponding normally horizontal arm 54B of a bell crank subassembly generally indicated at 54. Bell crank subassembly 54 comprises a normally horizontal shaft 54A which is supported at its opposite ends by suitable bearings 55 mounted on the under surface of brake base 18. Bell crank shaft 54A carries two laterally spaced normally horizontal arms 54B lying on opposite sides of spring retainer cup 35, each arm 54B having a corresponding notch 56 therein which is adapted to engage a corresponding one of the oppositely disposed lug or pins members 52 carried by spring retainer cup 35. Bell crank assembly 54 also includes a downwardly depending arm 54C which is pivotally connected contiguous its lower end at point 60 to the forward end of link member 50.

The rearward end of link 50 is pivotally connected at 48 to the lower end of downwardly depending arm 44C of a bell crank subassembly 44 to be described hereinafter.

At the upper end of vertical frame portion 14, a brake control handle generally indicated at 23 is provided and includes a pair of laterally spaced handle arms 23A, 23B which are respectively pivotally connected at corresponding pivot points 62 each to a corresponding mounting bracket 64 carried by the respective vertical frame members 14A, 14B. The outer ends of the respective handle arms 23A, 23B are connected together by a cross bar 66 which may be grasped by the operator to control the brakes of vehicular unit 10.

Each of the handle arms 23A, 23B contains an enlarged portion such as that indicated at 23A-1 of handle arm 23A which lies at the forward end of the respective handle arm (relative to the front-to-rear dimension of vehicular unit 10) and which receives the pivotal connection 62 of the respective handle arm to the corresponding mounting bracket 64 carried by vertical frame portion 14. The rearward end of each handle arm 23A, 23B is of generally U-shaped configuration, as defined by a handle arm portion such as 23A-2 which is substantially at right angles to the rearmost end of handle arm portion 23A-1 and by a handle arm portion such as 23A-3 which is substantially at right angles to handle arm portion 23A-2. The configuration just described defines a channel or notch 25 between the portions such as 23A-1, 23A-2 and 23A-3 of each respective handle arm.

Figure 5:
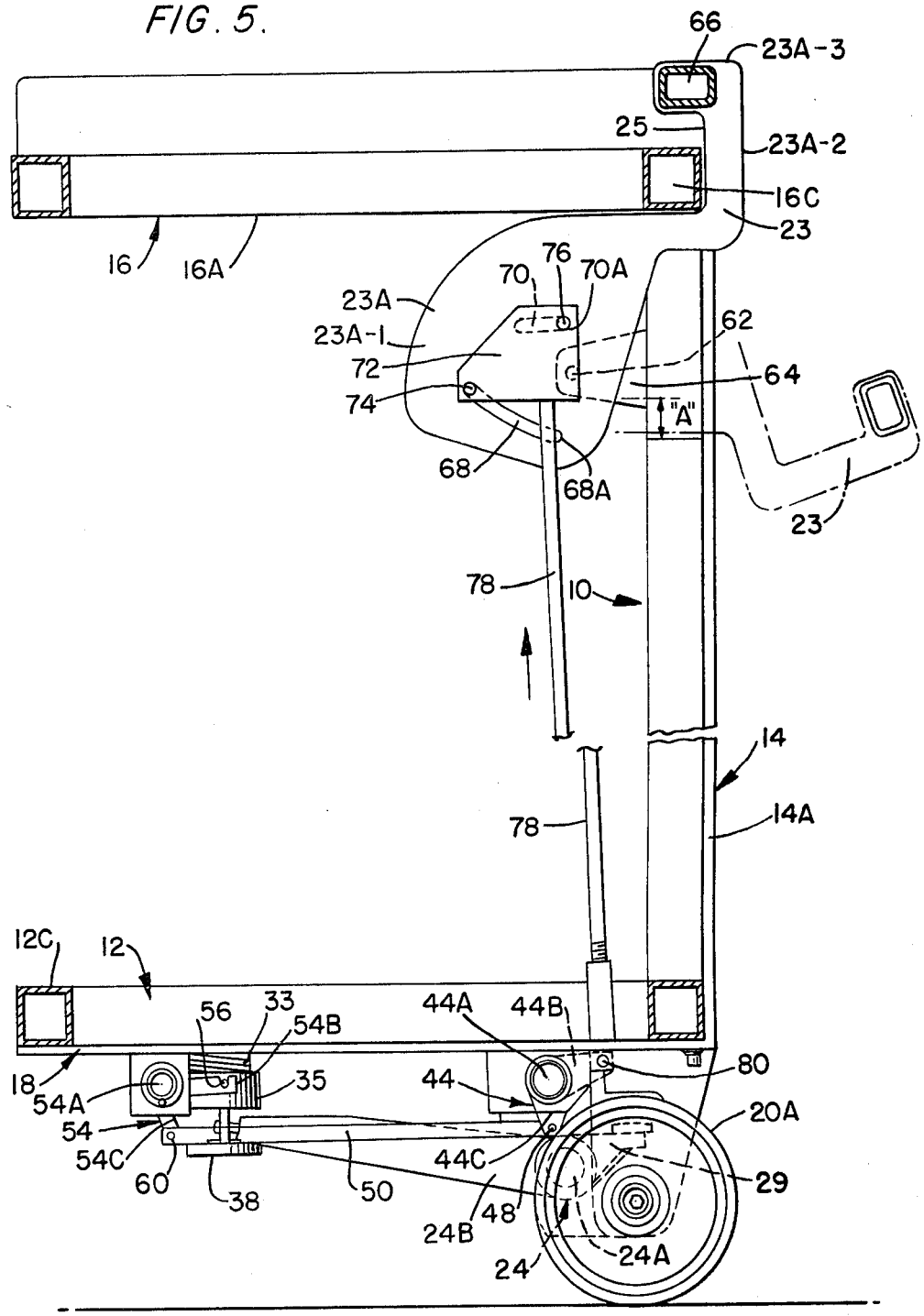
FIG. 5 shows in full line the position of the brake control handle corresponding to the procedural/storage mode of the mobile unit, in which the brake is released without the necessity of manual force being applied by the operator, thereby providing operator mobility during the medical diagnostic procedure without the necessity of the operator providing a continuous force on the brake control handle to release the brake.

As best seen in FIGS. 3, 4 and 5, handle arm 23A of brake control handle 23 is provided with a pair of spaced cam slots 68 and 70 and a movable cam follower plate 72 is adapted to cooperate with cam slots 68, 70 of bracket arm 23A. Cam follower plate 72 includes a pair of cam follower pins respectively indicated at 74 and 76 which are respectively adapted to ride in and follow cam slots 68, 70 of handle arm 23A. It should be noted that only handle arm 23A has the cam slots 68, 70.

An actuator rod 78 is rigidly attached, as by welding, at its upper end to cam follower plate 72, whereby movement of cam follower plate 72 due to the camming action of cam slots 68, 70 in handle arm 23A on cam follower pins 74, 76 carried by cam follower plate 72 is imparted to actuator rod 78. Also, the connection of the upper end of actuator rod 78 to cam follower plate 72 causes movement of actuator rod 78 to be transmitted in the reverse direction to cam follower plate 72 and thus to brake control handle 23 to automatically move brake control handle 23 from the transport position (FIG. 4) to the dead man position (FIG. 3) when manual force is released from brake control handle 23.

The lower end of actuator rod 78 is pivotally connected at 80 to the outer end of one arm 44B of what in effect is a bell crank mechanism generally indicated at 44 which is located beneath brake base 18. Bell crank mechanism 44 is supported by brake base 18 for rocking or pivotal movement about a horizontal axis and includes a horizontal "jack shaft" portion 44A (FIGS. 3, 5, and 7) which is supported at its laterally inner end by boss 32 and at its laterally outer end by a suitable bearing bracket extending downwardly from brake base 18. Bell crank mechanism 44 also includes a downwardly extending arm 44C carried by jack shaft 44A and which is pivotally connected at point 48 to the rearward end (relative to the front-to-rear dimension of vehicle 10) of link member 50.

DESCRIPTION OF OPERATION

"Dead Man" Position of Brake

If there is no manual force applied by the operator to brake control handle 23, handle 23 and the braking mechanism associated therewith will automatically assume the "dead man" position shown in FIG. 3 only from the "Transport" position of brake control handle 23 shown in FIG. 4, and not from the "Procedural-Storage" or "parked" position of brake control handle 23 shown in FIG. 5.

In the "dead man" position of brake control handle 23 shown in FIG. 3, spring 33 has expanded to push spring retainer cup 35 in a downward direction, causing downward movement of bridle 38, since bridle 38 rides on pins 40 which are an integral part of or fixed to spring retainer cup 35. Downward movement of bridle 38 causes brake lever arms 24B and 26B to which bridle 38 is secured to swing in a counterclockwise direction as viewed in FIGS. 3 and 7 to assume the position shown in FIG. 3.

Since brake lever arms 24B, 26B are respectively fixed to horizontal shafts 24A, 26A of the respective brake arm subassemblies 24, 26, the respective horizontal shafts 24A, 26A move in a counterclockwise direction (relative to FIGS. 3, 4, 5 and 7) with respect to bearing brackets 28, 30 and boss 32 in which shafts 24A, 26A are mounted, to cause the two laterally spaced brake shoes 22 mounted on the respective shafts 24A, 26A to move into braking engagement with the corresponding brake drums or braking surfaces 21 of the respective wheels 20A, 20B.

The force of spring 33 acting through the control linkage also causes brake control handle 23 to automatically move to the "dead man" position shown in FIG. 3 in the absence of manual pressure exerted by the operator on the handle.

The automatic movement of brake control handle 23 to the dead man position of FIG. 3 occurs as follows: With spring 33 in the expanded position corresponding to the "dead man" position of the brake as seen in FIG. 3, lugs or pins 52 carried by spring retainer cup 35 impart clockwise movement as viewed in FIGS. 3 and 7 to arms 54B of bell crank subassembly 54 to thereby cause bell crank arm 54C mounted on bell crank shaft 54A to swing to the left in a clockwise direction to assume the position shown in the view of FIG. 3, to thereby cause link 50 to move to the left to assume the position shown in FIG. 3. This causes bell crank arm 44C which is connected at pivot point 48 to the opposite or rearward end of link 50 to swing in a clockwise direction to rotate horizontal shaft 44A of bell crank subassembly 44 in a clockwise direction as viewed in FIG. 3. The clockwise movement of bell crank shaft 44A as just described causes clockwise movement of bell crank arm 44B to the outer end of which actuator rod 78 is pivotally secured. This, in turn, causes downward movement of cam follower plate 72 which is rigidly connected as by welding to actuator rod 78. The downward movement of cam follower plate 72 in response to downward movement of actuator rod 78 causes cam pin 74 carried by cam follower plate 72 to drivingly engage the lower end 68A of cam slot 68 of brake control handle arm 23A to cause brake control handle arm 23A and brake control handle 23 of which it is a part to swing upwardly and in a counterclockwise direction as viewed in FIG. 3 about pivot point 62 of handle 23 to the "dead man" position of handle 23 shown in FIG. 3.

"Transport Position" of the Brake

With brake control handle 23 in the "dead man" position shown in FIG. 3 in which brake shoes 22 are biased into engagement with brake drums 21 of the two wheels 20A, 20B as just described, assume now that it is desired to move wheeled vehicle 10 to a different location whereby to transport the medical diagnostic equipment or console mounted thereon to some different location. In order to release the dead man brakes to permit movement of vehicle 10, brake control handle 23 is swung downwardly in a clockwise direction as viewed in FIGS. 3 and 4 by grasping cross bar 66 to cause handle 23 to move to the position shown in FIG. 4 of the drawings in which the bottom edge of each of the handle arms 23A, 23B seats on a shoulder 14-1 of a corresponding vertical frame member 14A, 14B.

It will be noted in the "dead man" position of brake control handle 23 shown in FIG. 3 that cam follower pin 74 is at the bottom 68A of its corresponding slot 68 in control handle 23. When brake control handle 23 is swung in a clockwise direction, as viewed in FIGS. 3 and 4, to move control handle 23 pivotally about pivotal connection 62 from the FIG. 3 dead man position to the FIG. 4 "transport" position, the bottom edge 68A of cam slot 68 in control handle 23 positively drives cam follower pin 74 in a clockwise direction as viewed in FIG. 3, while cam follower pin 76 rides freely upwardly in the other cam slot 70 on control handle 23. While control handle 23 is moving from the dead man position of FIG. 3 to the transport position of FIG. 4, as well as after handle 23 has reached the transport position of FIG. 4, cam follower pin 74 at the bottom 68A of cam slot 68 bears the entire load of overcoming the force of spring 33, and cam slot 70 merely provides a passage to accomodate the travel of cam follower pin 76 during the movement of control handle 23 from the dead man position of FIG. 3 to the transport position of FIG. 4 and also to receive cam follower pin 76 when control handle 23 has reached and is in the transport position of FIG. 4.

It will be noted by comparing the position of cam follower plate 72 and of actuator rod 78 in the dead man position of control handle 23 shown in FIG. 3 with the position of these same members as shown in the transport position of FIG. 4, that in the "transport" position of FIG. 4 cam follower plate 72 and actuator rod 78 which is connected to plate 72 by welding or other suitable fixed connection have both moved vertically upwardly by the distance "A" (FIG. 4) relative to shoulder 14-1 of vertical frame member 14A as compared to the position of members 72 and 78 in the dead man position of FIG. 3. Distance "A" may be, for example, 0.5 inch.

Upward movement of actuator rod 78 upon movement of control handle 23 to transport position in turn causes a counterclockwise angular movement as viewed in FIG. 3 of bell crank subassembly 44 to which the lower end of actuator rod 78 is pivotally connected at pivotal connection 80. Counterclockwise angular movement of bell crank subassembly 44 causes link 50 to move to the right to assume the position shown in FIG. 5, to thereby cause a counterclockwise movement of bell crank subassembly 54. Counterclockwise movement of bell crank subassembly 54 causes an upward movement of bell crank arms 54B which engage oppositely disposed pins 52 carried by spring retainer cup 35 to thereby move spring retainer cup 35 in an upward direction which further compresses spring 33.

The upward movement of spring retainer cup 35 caused by the upward movement of bell crank arms 54B causes an upward movement of bridle 38 which rides on lugs 40 carried by spring retainer cup 35, thereby causing an upward (or clockwise as viewed in FIG. 7) movement of the forward (relative to the front-to-rear dimension of vehicle 10) ends of brake lever arms 24B, 26B. Since brake lever arms 24B, 26B are respectively secured to horizontal shafts 24A, 26A which are pivotally movable relative to bearing brackets 30, 31 and relative to central boss 32 on brake base 18, upward or clockwise movement of the forward ends of the respective lever arms 24B, 26B results in a clockwise angular rotation of horizontal shafts 24A, 26A of brake arm assemblies 24 and 26 as viewed in FIGS. 5 and 7. Since brake shoes 22 are secured by means of brake shoe support arms 29 to horizontal shafts 24A, 26A, clockwise rotation of shafts 24A, 26A causes brake shoes 22 to move out of braking engagement with the brake drums or braking surfaces 21 of the respective wheels 20A, 20B.

Thus, when brake control handle 23 is in the transport position of FIG. 4 and is held in that position by manual pressure exerted by the operator, brake shoes 22 are disengaged from the brake drums or braking surfaces 21 of the respective wheels 20A, 20B.

Procedural/Storage Position of the Brake

Assume now that the diagnostic medical apparatus mounted on wheeled vehicle 10 is in use or is about to be used and that it is necessary for the operator to have both hands free to maneuver the vehicle as may be required in connection with the diagnostic procedure and also to have both hands free for possible use in connection with the medical diagnostic procedure. Thus, in order to have both hands free, it is desirable that the operator not be required to exert manual pressure on brake control handle 23 in order to release the dead man brake.

In accordance with the invention and in order to achieve the objective just set forth, brake control handle 23 has a third position which may be used during the diagnostic procedure and also for storage of the mobile vehicular unit and which does not require that the operator exert manual pressure on brake control handle 23 in order to release the dead man brake.

Thus, referring to FIG. 5, it can be seen that brake control handle 23 has been swung about its pivotal axis 62 to the position shown in full line in FIG. 5 in which the notch-like recess 25 of handle 23 engages or straddles cross-bar portion 16C of upper frame portion 16.

In the "parked" or "procedural/storage" mode shown in full line in FIG. 5, it can be seen that cam follower pin 76 at the bottom end 70A of cam slot 70 in brake control handle 23 is the only cam follower pin overcoming the force of spring 33, while cam follower pin 74 floats freely in cam slot 68. During the counterclockwise motion of brake control handle 23 (as viewed in FIGS. 3, 4 and 5) in approaching the parked or procedural/storage position of handle 23 shown in FIG. 5, bottom edge 70A of cam slot 70 positively drives cam follower pin 76 while cam follower pin 74 rides freely in slot 68. During the movement of cam follower plate 72 produced by the interaction of cam follower pins 74, 76 and cam follower slots 68, 70 as just described, cam follower plate 72 and therefore actuator rod 78 which is fixedly connected to plate 72 are both moved to the left as compared to the position of cam follower plate 72 in the "dead man" position of FIG. 3 and in the transport position of FIG. 4. Also, in the parked or procedural/storage position of FIG. 5, cam follower plate 72 and actuator rod 78 have been raised vertically by the distance "A" (FIG. 5) above the height of cam follower plate 72 and actuator rod 78 in the dead man position of FIG. 3 and are at substantially the same vertical height relative to shoulder 14-1 on vertical frame member 14A as cam follower plate 72 and actuator rod 78 in the transport position (FIG. 4). As previously mentioned, the distance "A" may be, for example, 0.5 inch.

With actuator rod 78 in the elevated position corresponding to the position of cam follower plate 72 in the procedural/storage position of FIG. 5, the connecting linkage between the lower end of actuator rod 78 and spring retainer cup 35 is affected in the same manner as described in connection with the transport position of FIG. 4. That is, with actuator rod 78 in the procedural/storage position of FIG. 5, bell crank subassembly 44 is moved in a counterclockwise direction (as compared to the dead man position of FIG. 3) to cause a movement of link 50 to the right in which link 50 assumes the position shown in FIG. 5. This causes a counterclockwise movement of bell crank subassembly 54 (relative to the dead man position of FIG. 3), to thereby cause bell crank arms 54B which engage pins 52 of spring holder 35 to move spring retainer cup 35 upwardly against the pressure of spring 33 to thereby raise bridle 38 and the forward ends of brake lever arms 24B, 26B to which bridle 38 is secured to produce a clockwise rotation of brake lever arms 24B, 26B (as viewed in FIG. 7), and of horizontal shafts 24A, 26A to which the brake lever arms 24B, 26B are respectively secured. Clockwise angular rotation of horizontal shafts 24B, 26B causes a clockwise movement of brake shoes 22 out of braking engagement with brake drums 21 of the respective wheels 20A, 20B.

Thus, in the procedural/storage position of handle 23 shown in full line in FIG. 5, brake shoes 22 are moved out of braking relation to brake drums 21 in the same manner as in the transport position of brake control handle 23 shown in FIG. 4. However, in the procedural/storage position of the brake control handle shown in full line in FIG. 5, brake shoes 22 are maintained out of braking engagement with brake drums 21 without the necessity of having the operator exert continuous manual pressure on brake control handle 23, thus freeing both hands of the operator for maneuvering of the mobile vehicular unit 10 during the medical diagnostic procedure or for other use during the medical diagnostic procedure.

When brake control handle 23 is in the procedural/storage mode as shown in full line in FIG. 5, the handle does not spring back to the dead man position of FIG. 3 as it does from the transport mode of FIG. 4 because in the procedural/storage mode shown in full line in FIG. 5, cam follower pin 76 which carries all the load of overcoming the force of spring 33 in this mode has moved over center of the axis 62 of handle rotation, whereby in the overcenter position the force of spring 33 acting through actuator rod 78 causes a counterclockwise moment of handle 23 (as viewed in FIG. 5) about the center of rotation 62 of handle 23, to hold the handle in the full line position of FIG. 5. However, the operator can move handle 23 out of the procedural/storage position of FIG. 5 by grasping handle 23 and swinging it downwardly or in a clockwise direction as viewed in FIG. 5.

When brake control handle 23 is in the FIG. 5 position, the channel-shaped or notched contour of handle 23 indicated at 25 cooperates with the shape of the upper portion of the vehicle framework to permit handle 23 to be received in the position shown in full line in FIG. 5.

It should also be noted that when brake control handle 23 is in the full line position of FIG. 5 corresponding to the procedural/storage mode, the overall length of mobile vehicular unit 10 is less than when brake control handle 23 is in the dead man position (FIG. 3) or in the transport position (FIG. 4). Thus, with brake control handle 23 in the procedural/storage mode shown in FIG. 5, mobile vehicular unit 10 is dimensionally more compact to facilitate storage of the unit.

Besides being the linking component between spring retainer cup 35 and brake lever arms 24B, 26B, bridle 38 functions to compensate for eccentricities or differences in the braking surfaces or brake drums 21 of the two wheels 20A, 20B which may cause the two horizontal brake shafts 24A, 26A and consequently the two brake lever arms 24B, 26B to assume slightly different angular positions about the axis of the respective horizontal shafts 24A, 26B. Any difference in angular positions of the two brake lever arms 24B, 26B can be accomodated by a rocking movement of bridle 38, to which brake lever arms 24B, 26B are attached, about the horizontal axis of the two pins 40 mounted at diametrically opposite locations on the outer cylindrical surface of spring retainer cup 35. Bridle 38 is supported for rocking movement on pins 40 which lie along a diametral axis of spring retainer cup 35. The ability of bridle 38 to rock about the axis of pins 40 makes the braking arrangement capable of more equally distributing the braking force between the braking surfaces or brake drums 21 of the two rear wheels 20A, 20B despite any disparities, inequalities or eccentricities of the braking surface of one wheel as compared to the braking surface of the other wheel.

The spherical surface of bearing assemblies 43 to which the forward ends of brake lever arms 24B, 26B are secured permits movement of brake lever arms 24B, 26B relative to bridle 38 during any rocking movement of bridle 38 about pins 40 on spring retainer cup 35.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

The embodiments of the invention in which an exclusive property or privilege is claimed are defined as follows:

1. In a vehicle comprising a framework and at least one wheel supported for rotation by said framework, a brake surface carried by said at least one wheel, a brake shoe mounted for movement into or out of braking engagement with said brake surface, a support means mounted on said framework for angular pivotal movement about a substantially horizontal axis which lies substantially transverse of the longitudinal axis of said vehicle, said brake shoe being mounted on said support means for pivotal movement with said support means, a spring means mounted to normally exert force against said support means to cause said support means to pivotally move in a direction which moves said brake shoe into engagement with said brake surface whereby to normally provide a "dead man" brake, an actuator member for effecting movement of said brake shoe out of engagement with said brake surface, means connecting said actuator member to said support means whereby a predetermined movement of said actuator member moves said support means against the force of said spring means to move said brake shoe out of engagement with said brake surface, a brake control handle mounted on said framework, a first cam means including a cam element and a second cam means including a cam follower element, one of said cam means being carried by said control handle, the other of said cam means being connected to said actuator member and engageable with said cam means carried by said handle, whereby movement of said control handle to a predetermined position is effective to cause said predetermined movement of said actuator member due to the cooperative interaction of said first and said second cam means with each other, whereby to move said brake shoe out of engagement with said brake surface.

2. In a vehicle as defined in claim 1 in which said brake control handle is movable to a "transport" position in which it is manually held against the force of said spring means, and in which said actuator member is caused to have said predetermined movement due to the cooperative interaction of said first and said second cam means with each other, whereby to move said brake shoe out of engagement with said brake surface.

3. In a vehicle as defined in claim 2 in which said brake control handle automatically moves to a "dead man" position from said transport position when manual force is released from said handle; said spring means acting on said actuator member; and through said first and second cam means acting on said handle whereby to move said handle to said dead man position; and said spring means acting through said support means to cause movement of said brake shoe into engagement with said brake surface.

4. In a vehicle as defined in claim 1 in which said first cam means includes a first and a second cam element, and said second cam means includes a first and a second cam follower element, said first cam element and said first cam follower element being engageable in cooperative relation with each other and said second cam element and said second cam follower element being engageable in cooperative relation with each other.

5. In a vehicle as defined in claim 4 in which said first cam means including said first and second cam elements is on said handle and said second cam means including said first and second cam follower elements is connected to said actuator member, and in which said brake control handle is pivotally connected to said framework and is selectively movable about its axis of pivotal rotation to a "transport" position with said first cam element on said handle being in driving engagement to said first cam follower element during the pivotal movement of said handle to said "transport" position to cause said actuator member to have said predetermined movement, whereby to move said brake shoe against the force of said spring means out of engagement with said brake surface of said wheel, and to hold said brake shoe out of engagement with said brake surface as long as said control handle is manually held in said transport position.

6. In a vehicle as defined in claim 4 in which said first cam means including said first and second cam elements is on said handle and said second cam means including said first and second cam follower element is connected to said actuator member, and in which said brake control handle is pivotally connected to said framework and is selectively movable about its axis of pivotal rotation to a third or "parked" position with said second cam element on said handle being in driving engagement to said second cam follower element during the pivotal movement of said handle to said "parked" position to cause said actuator member to have said predetermined movement, whereby to move said brake shoe against the force of said spring means out of engagement with said brake surface of said wheel, said second cam follower element being in overcenter relation to the axis of pivotal rotation of said brake control handle when said brake control handle is in said third position, whereby the spring force acting through said actuator member provides a moment on said handle about said pivotal axis holding said handle in said "parked" position, said control handle being retained in said parked position by said spring force and without the application of manual force by the operator due to said overcenter relation.

7. In a vehicle as defined in claim 1 in which one of said cam means comprises a pair of spaced cam slots or tracks, and in which the other of said cam means comprises first and second cam follower pins which are respectively engageable with the respective cam slots in cam following relation thereto.

8. In a vehicle as defined in claim 7 in which said spaced cam slots or tracks are carried by said handle and in which said first and second cam follower pins are connected to said actuator member.

9. In a vehicle as defined in claim 8, a cam follower plate connected to and movable with said actuator member, said cam follower pins being carried by said cam follower plate.

10. In a vehicle as defined in claim 1 in which said brake control handle is pivotally connected to said framework.

11. In a vehicle as defined in claim 6 in which said brake control handle is pivotally mounted contiguous an upper portion of said framework, and is contoured to be received in interfitted nested relation with a portion of said framework when said brake control handle is swung upwardly about its pivotal connection to said framework to said parked position, whereby to reduce the longitudinal dimension of said vehicle as compared to the "dead man" and "transport" positions of said brake control handle, and thus whereby to render said vehicle more compact for storage when said brake control handle is in said "parked" position.

12. In a vehicle as defined in claim 1, said support means comprising a lever extending in a direction lengthwise of said vehicle on an opposite side of said horizontal axis from said brake shoe, whereby said lever pivotally moves with said support means and said brake shoe about said horizontal axis, said spring means being mounted to normally exert force against said lever to cause said support means to move in a direction which moves said brake shoe into engagement with said brake surface.

13. In a vehicle as defined in claim 1 in which said support means comprises a shaft supported by said framework for angular pivotal movement about said substantially horizontal axis, said brake shoe being mounted on said shaft for pivotal movement with said shaft, a lever secured to said shaft and extending in a direction lengthwise of said vehicle on an opposite side of said horizontal axis from said brake shoe, whereby said lever, said shaft, and said brake shoe pivotally move as a unit about said horizontal axis, said spring means being mounted to normally exert force against said lever to cause said lever and said shaft to pivotally move in a direction which moves said brake shoe into engagement with said brake surface.

14. In a vehicle as defined in claim 1, a first and a second wheel supported in laterally spaced relation to each other by said framework, a brake surface carried by each of said wheels, a separate brake shoe corresponding to the brake surface of each of said wheels, a separate support means for each of said brake shoes, each of said support means including a separate horizontal shaft which is separately pivotable about a substantially horizontal axis, said separate horizontal shafts lying along a common axis, each of said brake shoes being mounted on and pivotally movable with its respective support means, whereby to distribute the braking force substantially equally between the two wheels regardless of disparities between the braking surfaces of said two wheels.

15. In a vehicle as defined in claim 14, a retainer means for said spring, means connecting each of said separate support means to said retainer means, link means connecting said actuator member to said retainer means, whereby said actuator member is effective in predetermined positions of said control handle to raise said retainer means and said support means against the force of said spring means to a position in which said brake shoes are moved out of engagement with the brake surfaces of the respective wheels.

16. In a vehicle as defined in claim 14, a cup-like retainer for said spring, a bridle member positioned about the outer periphery of said cup-like retainer, said bridle member being pivotally mounted on said cup-like retainer for pivotal movement about a substantially horizontal axis extending substantially transversely to the axis of rotation of said wheels and substantially equidistant between said wheels, said separate support means each respectively comprising lever means connecting the corresponding support means to said bridle respectively on opposite sides of the pivotal axis of said bridle, said bridle being rockably movable about its pivotal mounting to said cup-like retainer to provide substantial equalization of the braking force applied by said spring to the brake surfaces of said two wheels despite any disparities or inequalities in the brake surface of one of said wheels as compared to the brake surface of the other of said wheels.

17. In a vehicle as defined in claim 16 in which the connection between each of said lever means and said bridle includes cooperating spherical surface portions which permit relative movement between each lever means and said bridle.

18. In a vehicle comprising a framework, a first and a second wheel supported in laterally spaced relation to each other by said framework, a brake surface carried by each of said wheels, a separate brake shoe corresponding to the brake surface of each of said wheels, a separate support means for each of said brake shoes, each of said support means including a separate horizontal shaft which is separately pivotable about a substantially horizontal axis, said separate horizontal shafts lying along a common axis, spring means mounted to normally exert force against said separate support means to cause said separate support means to each respectively normally pivotally move in a direction which moves the respective brake shoes into engagement with a corresponding braking surface whereby to normally provide a "dead man" brake, a cup-like retainer for said spring means, an actuator member operatively connected to said retainer and movable to a predetermined position for effecting movement of the respective brake shoes against the force of said spring means and out of engagement with the corresponding brake surfaces of said wheels, means for moving said actuator member to said predetermined position, and a bridle member positioned about the outer periphery of said cup-like retainer, said bridle member being pivotally mounted on said cup-like retainer for pivotal movement about a substantially horizontal axis extending substantially transversely to the axis of rotation of said wheels and substantially equidistant between said wheels, said separate support means each respectively comprising lever means connecting the corresponding support means to said bridle respectively on opposite sides of said pivotal axis of said bridle, said bridle being rockably movable about its pivotal mounting to said cup-like retainer to provide substantial equalization of the braking force applied to the brake surfaces of said two wheels despite any disparities or inequalities in the brake surface of one of said wheels as compared to the brake surface of the other of said wheels.

19. In a vehicle as defined in claim 18 in which the connection between each of said lever means and said bridle includes cooperating spherical surface portions which permit relative movement between each lever and said bridle.

* * * * *